Figure 1:
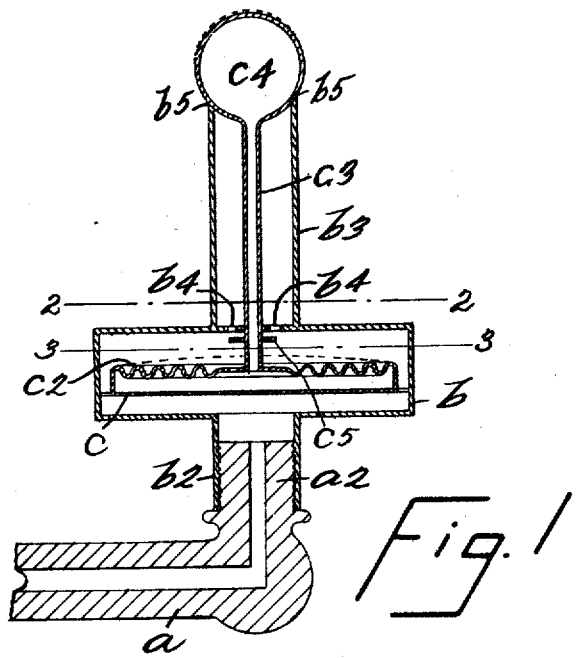

No. 831,723.  
PATENTED SEPT. 25, 1906.  
F. C. HUBER.  
SAFETY GAS BURNER.  
APPLICATION FILED FEB. 3, 1906.

WITNESSES  
INVENTOR  
Frederick C. Huber  
BY Edgar Tate & Co  
ATTORNEYS

UNITED STATES PATENT OFFICE.

FREDERICK C. HUBER, OF FORT WADSWORTH, NEW YORK.

SAFETY GAS-BURNER.

No. 831,723.  Specification of Letters Patent.  Patented Sept. 25, 1906.

Application filed February 3, 1906. Serial No. 299,280.

*To all whom it may concern:*

Be it known that I, FREDERICK C. HUBER, a citizen of the United States, residing at Fort Wadsworth, in the county of Richmond and State of New York, have invented certain new and useful Improvements in Safety Gas-Burners, of which the following is a specification, such as will enable those skilled in the art to which it appertains to make and use the same.

This invention relates to safety gas-burners; and the object thereof is to provide a device of this class which will be automatically closed if the flame of the burner should at any time be accidentally extinguished without the flow of gas having been cut off.

The invention is fully disclosed in the following specification, of which the accompanying drawings form a part, in which the separte parts of my improvement are designated by suitable reference characters in each of the views, and in which—

Figure 2:
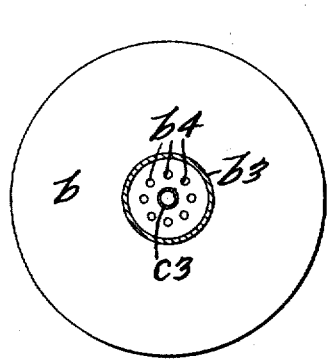
Figure 3:
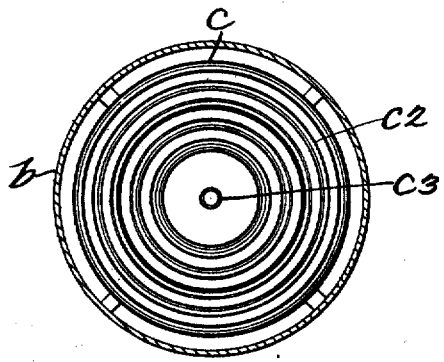

Figure 1 is a central vertical section of a gas-burner made according to my invention; Fig. 2, a transverse section on the line 2 2 of Fig. 1, and Fig. 3 a section on the line 3 3 of Fig. 1.

In the drawings forming part of this specification, I have shown at $a$ an ordinary gas-fixture provided with the usual coupling-nipple $a^2$, and in the practice of my invention I provide a burner which comprises a main casing $b$, preferably circular in horizontal section, and the bottom of which is provided with a depending and threaded tubular coupling $b^2$, whereby the burner may be connected with the nipple $a^2$ in the usual manner. The top of the casing $b$ is provided centrally with an upwardly-directed tube $b^3$, which is open at the top and closed at the bottom, the closed bottom of said tube being perforated, as shown at $b^4$.

Within the casing $b$ is placed a supplemental casing $c$, which is of smaller dimensions than the casing $b$, and said casing $c$ is secured concentrically in the casing $b$, so that gas passing through the casing $b$ is free to pass around the casing $c$, and the top of the casing $c$ is composed of thin corrugated metal, as shown at $c^2$, and said top of the casing $c$ is provided centrally with a tube $c^3$, which passes upwardly through the tube $b^3$ and centrally therein, and is provided at its upper end with a hollow body $c^4$, which in the form of construction shown is spherical in form, but which may be of the form of an inverted cone or of any other shape which will enable it to close the upper end of the tube $b^3$ when in the position shown in Fig. 1.

The tube $c^3$ is free to move through the bottom of the tube $b$, and just below said bottom of the tube $b$ the tube $c^3$ is provided with laterally-directed lugs or stops $c^5$, which limit the upward movement of the tube $c^3$.

The casing $c$, the tube $c^3$, and the body $c^4$ at the top of the tube $c^3$ are filled with air, and the operation of my improved burner is as follows:

It will be understood, of course, that the fixture $a$ is in practice provided with a gas cock or valve in the usual manner, and whenever it is desired to ignite the burner the gas is turned on and a match, taper, or similar device is ignited and held at the top $b^5$ of the tube $b^3$, and the air in the part $c^4$, $c^3$, and $c$ is instantly heated and expanded, and this operation raises the top $c^2$ of the casing $c$ and raises the body $c^4$ and allows the gas to escape at $b^5$, where it is ignited and burns around the body $c^4$, thus producing a circular flame similar to that of an Argand burner. If at any time the flame should be extinguished either by a gust of wind or by accidentally leaving open the burner when turning off the gas by means of the valve or cock in the fixture $a$, the air in the part $c^4$, $c^3$, and $c$ will become cool, the pressure occasioned in the said parts by the heating of the air will be relaxed, and the top $c^2$ of the casing $c$ will draw down the body $c^4$ onto the top of the tube $b^2$ and the flow of the gas will be cut off.

My invention is not limited to the perforations in the bottom of the tube $b^3$ nor to the means shown and described for limiting the upward movement of said tube, and any suitable device or devices may be employed for this purpose.

Having fully described my invention, what I claim as new, and desire to secure by Letters Patent, is—

1. A gas-burner, comprising a main casing adaped to be connected with a gas-fixture and provided with a central upwardly-directed tube, a supplemental casing placed in the main casing and the top of which is provided with a tube which extends upwardly through the tube of the main casing and is provided at its upper end with a hollow body adapted to close the last-named tube, substantially as shown and described.

2. A gas-burner, comprising a main casing adapted to be connected with a gas-fixture and provided with a central upwardly-directed tube, a supplemental casing placed in the main casing and the top of which is provided with a tube which extends upwardly through the tube of the main casing and is provided at its upper end with a hollow body adapted to close the last-named tube, the top of the supplemental casing being corrugated, substantially as shown and described.

3. A gas-burner comprising a main casing adapted to be connected with a gas-fixture and the top of which is provided with a central upwardly-directed tube, a supplemental closed casing placed in the main casing and around which the gas is free to flow and the top of which is elastic and is provided with a tube which extends upwardly through the tube in the main casing and is provided at its upper end with a body adapted to close the last-named tube, substantially as shown and described.

4. A gas-burner comprising a main casing adapted to be connected with a gas-fixture and the top of which is provided with a central upwardly-directed tube, a supplemental closed casing placed in the main casing and around which the gas is free to flow and the top of which is elastic and is provided with a tube which extends upwardly through the tube in the main casing and is provided at its upper end with a hollow body adapted to close the last-named tube, substantially as shown and described.

In testimony that I claim the foregoing as my invention I have signed my name, in presence of the subscribing witnesses, this 2d day of February, 1906.

FREDERICK C. HUBER.

Witnesses:
F. A. STEWART,
C. E. MULREANY.